(12) United States Patent
Kitayama et al.

(10) Patent No.: US 9,368,156 B2
(45) Date of Patent: Jun. 14, 2016

(54) OPERATION DEVICE

(71) Applicant: YAMAHA CORPORATION, Hamamatsu-shi, Shizuoka-ken (JP)

(72) Inventors: Toru Kitayama, Hamamatsu (JP);
Tatsuya Umeo, Hamamatsu (JP);
Mitsunori Ochi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 405 days.

(21) Appl. No.: 14/076,043

(22) Filed: Nov. 8, 2013

(65) Prior Publication Data

US 2014/0129014 A1    May 8, 2014

(30) Foreign Application Priority Data

Nov. 8, 2012    (JP) ................................. 2012-246802

(51) Int. Cl.
| | | |
|---|---|---|
| *G06F 17/00* | (2006.01) | |
| *G11B 27/031* | (2006.01) | |
| *H04L 29/08* | (2006.01) | |
| *H04H 60/04* | (2008.01) | |

(52) U.S. Cl.
CPC ............ *G11B 27/031* (2013.01); *H04H 60/04* (2013.01); *H04L 67/125* (2013.01)

(58) Field of Classification Search
CPC .. H04L 67/125; H04L 29/08846; H04L 67/14
See application file for complete search history.

(56) References Cited

U.S. PATENT DOCUMENTS

| | | | | |
|---|---|---|---|---|
| 7,620,468 | B2* | 11/2009 | Shimizu | H04H 60/04 381/119 |
| 8,879,753 | B2* | 11/2014 | Okabayashi | H04L 67/125 381/119 |
| 2008/0175413 | A1* | 7/2008 | Okabayashi | H04L 67/125 381/119 |
| 2009/0307395 | A1* | 12/2009 | Umeo | G08C 19/00 710/61 |
| 2011/0087997 | A1 | 4/2011 | Lee et al. | |

FOREIGN PATENT DOCUMENTS

EP    2 506 465 A2    10/2012

OTHER PUBLICATIONS

European Search Report mailed Mar. 6, 2014, for EP Application No. 13192137.1, seven pages.
Euphonix, Inc. (2008). "MC Mix Professional Control Surface, User Guide," Music-Audio-Post-Video-Film, Euphonix, Artist Series, Palo Alto, CA, 102 pages.

* cited by examiner

*Primary Examiner* — Curtis Kuntz
*Assistant Examiner* — Thomas Maung
(74) *Attorney, Agent, or Firm* — Morrison & Foerster LLP

(57) ABSTRACT

A controller includes a plurality of channel strips to which are allocated any one of a plurality of channels to be handled in a DAW. Each of the channel strips includes a channel strip display section, a movable fader capable of indicating a sound volume level of the allocated channel by means of a knob position of the fader, and a slide operation reception section operable to successively change the allocated channel. During a slide operation on the reception section, a CPU continuously updates only displayed content on the channel strip display section of each of the channel strips by a variation amount corresponding to the slide operation. Upon completion of the slide operation on the reception section, the CPU moves, through automatic control, the knob position of the movable fader of each of the channel strips.

20 Claims, 4 Drawing Sheets

OPERATION DEVICE

BACKGROUND

The present invention relates to an operation device for operating parameters to be used in signal processing and a non-transitory computer-readable storage medium storing a program for operating parameters to be used in signal processing, which are suitably applicable to desired signal processing devices, such as a mixer.

Recent years have seen wide-spread use of a system which is constructed to perform various signal processing functions, such as a music production function and a video editing function, by a personal computer (PC) or other computer device executing dedicated application programs, such as a software application for a music production system (commonly known as "DAW" that is an abbreviation of Digital Audio Workstation). In this type of system, an operation device (also referred to as "controller") is provided for operating an application running on the computer device. The operation device or controller is, for example, a DAW-dedicated controller externally connected to a PC. Generally, such a type of controller includes a plurality of channel strips. A multiplicity of logical signal processing channels to be used for various signal processing functions by the application are allocated as objects of operation, or operation targets, of the channel strips. A user can adjust values of various parameters of the allocated channels by use of operators (i.e., input elements) of the individual channel strips.

For example, the controller disclosed in "MC Mix (registered trademark) professional control surface" available from the Internet at http://connect.euphonix.com/documents/MC-_Mix_User_Guide_rB_Jap.pdf (hereinafter referred to as "Non-patent Literature 1") includes a push-type channel shift button as a means for collectively changing the channel allocation to the individual channel strips. Per user's pushing or depressing operation of the channel shift button, the user can collectively change allocated channels of the channel strips to different or other channels by one channel (i.e., by a change amount equal to one channel).

Generally, the controller includes notification sections that notify information about allocated channels of (to) the individual channel strips. Each of the notification sections includes a display section that displays a channel name or the like, and a movable fader that notifies a value of a parameter, such as a sound volume level, by moving a position of a knob portion. Generally, such a notification section is constructed in such a manner that, each time the allocated channel is changed by one channel (i.e., by a change amount equal to one channel), the information about the allocated channel too is updated by one channel and, then, updating of content or information notified by the notification section is repeated until the allocated channel has been changed or shifted or switched to a desired allocated channel, i.e., until a channel shift instruction has been completed.

However, with the above-described construction where the content or information notified by the notification section is updated each time the allocated channel is changed, movable component parts, such as the movable fader, of the notification section would be unnecessarily fatigued because the movable components are driven extremely frequently while the allocated channel is successively shifted (changed). Besides, such frequent movement of the movable component parts, such as the movable fader, tends to be visually bothersome or annoying to the user and hence unnecessarily fatigues the user. Further, the frequent movement of the movable component parts, such as the movable fader, would disturb the user's operation for switching the allocated channel

SUMMARY OF THE INVENTION

In view of the foregoing prior art problems, it is an object of the present invention to provide an operation device and program which, even when a signal processing channel allocated to an operation section is successively switched, can appropriately notify information about the allocated channel. More specifically, it is an object of the present invention to provide an improved operation device and program which, even when the signal processing channel allocated to the operation section is successively changed, can appropriately notify a change state of the signal processing channel without unnecessarily fatiguing component parts and without making a user feel annoyance.

In order to accomplish the above-mentioned object, the present invention provides an improved operation device, which comprises: an operation section to which is allocatable, as an operation target, any one of a plurality of signal processing channels; a first notification section configured to notify first information about the signal processing channel allocated to the operation section; a second notification section configured to notify second information about the signal processing channel allocated to the operation section; a reception section configured to receive a user's instruction for switching an operation target of the operation section, the reception section being configured to continuously receive the instruction; a first update section configured to, while the reception section is continuously receiving the instruction, continuously update the first information, notified by the first notification section, in response to the instruction and maintain, without updating, the second information notified by the second notification section; and a second update section configured to, upon completion of the instruction having been continuously received by the reception section, update the second information, notified by the second notification section, in response to the instruction completed.

According to the operation device of the present invention, while the reception section is continuously receiving the user's instruction for switching the operation target (object of operation) of the operation section, only the information notified by the first notification section (i.e., the first information) is continuously updated in response to the instruction being continuously received by the reception section, and the information notified by the second notification section (i.e., the second information) is maintained without being updated. Then, once the instruction for switching the operation target of the operation section is completed without continuing any longer, the information notified by the second notification section (i.e., the second information) is updated in response to the instruction completed. The first notification section is, for example, a display section that displays a channel name or the like of the allocated signal processing channel. The second notification section is, for example, a movable fader that indicates or notifies a value of a parameter, such as a sound volume level, by means of a position of a knob portion (i.e., knob position).

Even when the signal processing channel allocated to the operation section is successively changed or switched, the present invention constructed in the aforementioned manner can appropriately notify information about the allocated signal processing channel. More specifically, while the reception section is continuously receiving the user's instruction for switching the operation target of the operation section, the present invention can, for example, prevent the knob position of the movable fader from moving but also display the channel name or the like in response to successive shifting of the signal processing channel. Thus, the present invention can notify the information of the allocated signal processing channel in such a manner as to allow the user to readily check a successive change state of the allocated signal processing channel without unnecessarily fatiguing component parts, without making the user feel annoyance, without unnecessarily fatiguing the user and without disturbing the operation for successively switching the allocated signal processing channel.

The present invention may be constructed and implemented not only as the device invention discussed above but also as a method invention. Also, the present invention may be arranged and implemented as a software program for execution by a processor, such as a computer or DSP, as well as a non-transitory computer-readable storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
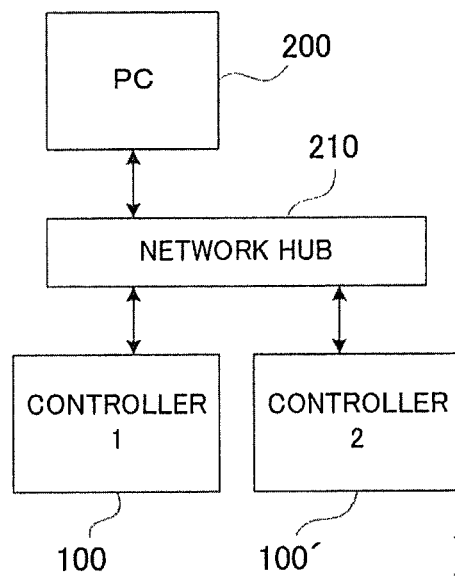
FIG. 1 is a block diagram showing an overall construction of a music production system including a preferred embodiment of a controller of the present invention.

FIG. 1 is a block diagram showing an overall construction of a music production system including a preferred embodiment of an operation device of the present invention. The music production system comprises one or more controllers 100 and a computer device 200 that are interconnected via a network hub 210. The computer device 200 is, for example, a general-purpose personal computer (PC) which performs various music-production-related signal processing functions by activating a software application (DAW that is an abbreviation of Digital Audio Workstation) for the music production system (hereinafter also referred to as "music production system software application") that causes the computer device (PC) 200 to perform the music-production-related signal processing functions. Among the various music-production-related signal processing functions are recording of music content using a plurality of recording tracks, editing of recorded music content, mixing processing using a plurality of channels. The music content here comprises digital audio waveform data of a plurality of channels and/or MIDI (Musical Instrument Digital Interface) data. The term "channels" is used herein to refer to any types of logical signal processing channels, such as recording tracks, mixing processing channels and mixing buses, that are used for processing a group of digital audio waveform data and/or MIDI data.

The controller 100 is the operation device provided with a plurality of physical operators (input elements) for operating the DAW running on the PC 200. As shown in FIG. 1, a plurality of the controllers or operation devices 100 ("controller 1" 100 and "controller 2" 100' in FIG. 1) can be connected to the single music production system. An operation target of, i.e., target of operation by, the plurality of the controllers 100 is the same DAW running on the PC 200. By connecting the plurality of the controllers (operation devices) 100 to the music production system, it is possible to increase the number of physical operators to be used for operating the single DAW as the operation target.

Using the controllers 100, a user can control and adjust behavior (values of various parameters, routing of audio waveform data and/or MIDI data, etc.) of various signal processing to be performed by the DAW running on the PC 200. Note that the computer device 200 may be any desired computer device other than the PC, such as a tablet, PDA or smart phone, as long as it is capable of executing the DAW.

The network hub 210 relays communications between the PC 200 and the controllers 100 by establishing connection paths between the PC 200 and the controllers 100. For example, a general-purpose network communication system, such as one compliant with the Ethernet (registered trademark) standard, is used for communication of control data between the PC 200 and the controllers 100. Further, audio waveform data communication paths different from control data communication paths are set for communication of digital audio waveform data between the PC 200 and the controllers 100.

Figure 2:
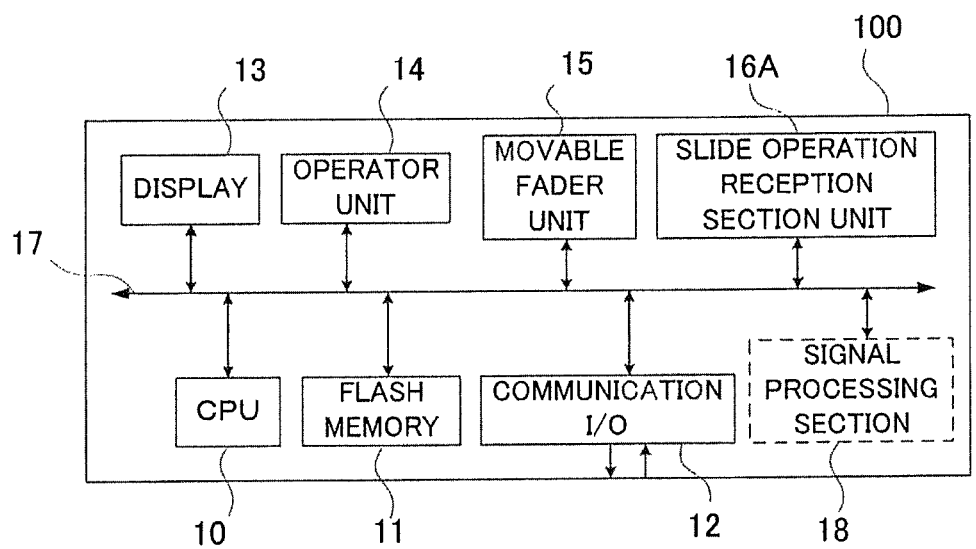
FIG. 2 is a block diagram showing an electric hardware construction of the embodiment of the controller.

FIG. 2 is a block diagram showing an electric hardware construction of the controller 100. As shown in FIG. 2, the controller 100 includes a CPU (Central Processing Unit) 10, a flash memory 11, a communication interface (communication I/O) 12, a display 13, an operator unit 14, a movable fader unit 15 and a slide operation reception section unit 16A, which are interconnected via a bus 17.

The CPU 10 controls general behavior of the controller 100 by executing programs stored in the flash memory 11. The flash memory 11 stores therein various programs for execution by the CPU 10, and various control data including values (current data) of various parameters, and the flash memory 11 is also used as loading and working areas for a program to be executed by the CPU 10.

The communication I/O 12 comprises one or more well-known general-purpose interfaces, such as the RS-422, USB (Universal Serial Bus) and Ethernet (registered trademark) standards. The controller 100 communicates various control data and audio waveform data with the PC 200 via the communication I/O 12. Further, the communication I/O 12 may include an external audio output, such as a headphone output, so that it can be used for monitoring music content being processed by the DAW.

The display 13, operator unit 14, movable fader unit 15 and slide operation reception section unit 16A are user interfaces provided on an operation panel of the controller 100. The CPU 10 controls displays of various information, such as turning on/off of LEDS and display of character/letter information to be displayed on the display 13, for example, on the basis of a display instruction generated in response to an operation on the operator unit 14, movable fader unit 15 or slide operation reception section unit 16A or a display control signal received from the PC 200. The CPU 10 detects each operation on the operator unit 14, movable fader unit 15 or slide operation reception section unit 16A and performs a process corresponding to the detected operation. Examples of such a process include display updating of the display 13, updating of current data, transmission, to the PC 200, of control data corresponding to the detected operation, etc. Further, knob positions in the movable operator unit 15 are automatically controlled by the CPU 10 on the basis of drive control signals.

Figure 3:
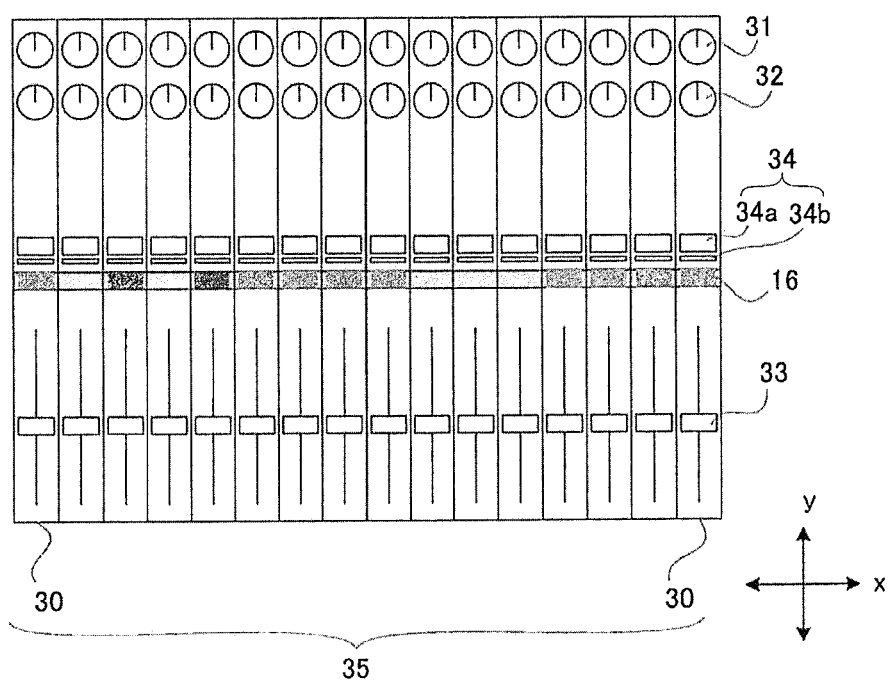
FIG. 3 is a diagram explanatory of an example construction of an operation panel of the embodiment of the controller.

FIG. 3 is a diagram explanatory of an example construction of the operation panel of the controller 100. As shown in FIG. 3, the controller 100 includes a plurality of (16 (sixteen) in the illustrated example) channel strips 30. Each of the channel strips 30 is an operation section which has a shape elongated vertically (i.e., in a vertical direction indicated by a double-head arrow y) and which includes a plurality of operators for adjusting values of parameters for a channel that is allocated to the channel strip 30 as an operation target of the channel strip 30 (operation-target channel). Note that a lower side (i.e., lower side in the vertical direction indicated by the double-head arrow y) in FIG. 3 corresponds to a side of the operation panel closer to the user while an upper side (i.e., upper side in the vertical direction indicated by the arrow y) corresponds to a side of the operation panel farther from the user. For convenience of description, the above-mentioned side of the operation panel closer to the user will sometimes be referred to as "lower side" or "closer-to-user side" while the side of the operation panel farther from the user will sometimes be referred to as "upper side" or "farther-from-user side". The plurality of channel strips 30 are provided together within an area called "channel strip section 35" and fixedly arranged, side by side, in a left-right direction (i.e., horizontal direction indicated by a double-head arrow x) as viewed from the user.

To each of the channel strips 30 is allocated any (typically, one) of a plurality of channels to be handled in the DAW (i.e., music production system software application set as the operation target of the controller 100) running on the PC 200. A channel allocated to a given one of the channel strips 30 will hereinafter be referred to also as "allocated channel". The allocated channel is a desired type of channel, such as a recording track, a channel to be used in the mixing processing, a mixing bus, or the like. Stated differently, it is only necessary that the allocated channel be controllable by a group of parameters allocatable to one channel strip 30 as objects of operation by the channel strip 30. Because the total number of the channels to be handled in the DAW running on the PC 200 is greater than the total number of the channel strips 30 (sixteen channel strips 30 in the illustrated example), the respective allocated channels of (to) the channel strips 30 can be changed to other channels via the slide operation reception section unit 16A as will be described later.

The allocated channels of (to) the channel strips 30 are consecutive in channel number; namely, the channels are allocated to the channel strips 30 in an order of the channel numbers. For example, the channels are allocated to the channel strips 30, sequentially from left to right, in an increasing order of the channel numbers. Generally, in the DAW, various types of channels are managed with their consecutive channel numbers. For example, in a case where the DAW handles n (n is a number equal to or greater than 16) recording tracks having consecutive channel numbers 1 to n and where such tracks of channel numbers 1 to n are to be allocated to the 16 channel strips 30, the 16 recording tracks of the consecutive channel numbers (e.g., channel numbers 1 to 16) are allocated to the 16 channel strips 30 in the order of the channel numbers.

Each of the channel strips 30 includes, as operators (input elements) for adjusting values of parameters of the channel allocated thereto, two channel strip knobs 31 and 32 and one channel strip fader 33, as well as a channel strip display section 34 for displaying information about the allocated channel. In addition to the above, each of the channel strips 30 includes a slide operation reception section 16. Each of the channel strips 30 includes the same component parts including the above-mentioned channel strip knobs 31 and 32, fader 33, display section 34 and reception section 16. The slide operation reception section unit 16A comprises a plurality of the slide operation reception sections 16

In each of the channel strips 30, the channel strip knobs 31 and 32, the channel strip display section 34, the slide operation reception section 16 and the channel strip fader 33 are arranged sequentially from up to down (i.e., from the upper side (farther-from-user side) to the lower side (closer-to-user side) of the operation panel), and such an arrangement of the component parts is the same among all of the channel strips 30. Thus, the slide operation reception sections 16 of the individual channel strips 30 are arranged, at a same vertical position (i.e., at a same position in the vertical direction indicated by the double-head arrow y) in a horizontal straight row along the horizontally arranged direction (indicated by the double-head arrow y) of the channel strips 30. Similarly, the knobs 31 and 32, channel strip display sections 34 and channel strip faders 33 of the individual channel strips 30 are arranged, at same vertical positions, in respective horizontal rows.

In each of the channel strips 30, the two channel strip knobs 31 and 32 are operators of a rotary operation type corresponding to (belonging to) the operator unit 14 of FIG. 2, and these channel strip knobs 31 and 32 are used (or operable), for example, to adjust values of a gain and stereo pan of the allocated channel. The channel strip fader 33, which corresponds to (belongs to) the movable fader unit 15 of FIG. 2, has a knob portion movable linearly in the vertical direction indicated by the double-head arrow y, i.e. in a direction between the closer-to-user side and the farther-from-user side. The channel strip fader 33 is used, for example, to adjust a value of a sound volume level of the allocated channel. The knob portion of the fader 33 can be automatically controlled in position as noted above, and, using such automatic positional control of the knob portion, the channel strip 30 can function as a notification section (second notification section) for notifying information (e.g., value of a sound volume) of the allocated channel by a position of the knob portion.

The channel strip display section 34, which corresponds to (belongs to) the display 13 of FIG. 2, includes a channel name display portion 34a that displays a channel name assigned to the allocated channel, and a channel color display portion 34b that displays a channel color set for the allocated channel. The channel strip display section 34 can function as a notification section (first notification section) for notifying information (e.g., channel name and color) of the allocated channel.

Further, the slide operation reception section 16 is an operator that receives a slide operation instructing a change of a value of a parameter set as an object of operation or operation target of the section 16. In the instant embodiment, the parameter set as the operation target of the slide operation reception section 16 is indicative of channels to be allocated to individual ones of the channel strips. Namely, the parameter set as the operation target (i.e., operation-target parameter) of the slide operation reception section 16 is a parameter to be applied to all of the channel strips, not to one channel strip alone. More specifically, channels to be allocated to the plurality of channel strips 30 are collectively changed in response to an operation performed on the slide operation reception section unit 16A.

The slide operation reception section 16 located within each one of the channel strips 30 has a belt-shaped contact surface of substantially the same width (i.e., substantially the same horizontal length) as the one channel strip 30, so that a slide operation performed by the user on the contact surface can be received (detected) via the contact surface. Such a slide operation is an operation in which the user causes a hand finger or the like to contact or touch the slide operation reception section 16 (more specifically, the above-mentioned contact surface) and moves the touch (touched position) in the horizontal (left-right) direction indicated by the double-head arrow x. The slide operation reception section 16 continuously receives (detects) a continuous variation of the touched position (slide operation) as an instruction for changing the value of the operation target parameter. Note that the term "touch" of the slide operation also embraces a "non-touch" operation detectable as a touch although the finger or the like is not actually touching the contact surface of the slide operation reception section 16. Note that the slide operation may be detected by any conventionally-known detection method, such as the electrostatic capacitance method, as long as the detection method can detect operation information about the slide operation.

The slide operation reception section 16 is disposed in such a manner that an operating direction of a slide operation thereon corresponds to (agrees with) the arranged direction of the channel strips 30 indicated by the double-head arrow x. Such an operating direction of a slide operation (i.e., the arranged direction of the channel strips 30) is the same as a direction in which the value of the operation target parameter of the slide operation reception section 16 varies (in the illustrated example, a direction in which the channels allocated to the channel strips 30 can be shifted or displaced), and such a direction of a slide operation on the slide operation reception section 16 is different from operating directions of the other operators than the slide operation reception section 16, such as the channel strip knobs 31 and 32 and the channel strip fader 33 and the like, provided on the channel strip 30. In the instant embodiment, the slide operation reception section 16 is disposed in such a manner that its operating direction perpendicularly intersects the vertical operating direction of the channel strip fader 33.

The slide operation reception sections 16 provided in all of the channel strips 30 together constitute or function as the single slide operation reception section unit 16A, which is constructed to simultaneously adjust the channel allocation to all of the channel strips 30. A single continuous belt-shaped contact surface can be formed, for example, by seamlessly interconnecting the slide operation reception sections 16 provided in adjoining ones of the channel strips 30. Namely, the slide operation reception sections 16 (slide operation reception section unit 16A) are, as a whole, disposed to extend across two or more channel strips 30 and constructed to be operated in the above-mentioned operating direction corresponding to the arranged direction of the channel strips 30. In this case, the CPU 10 detects a slide operation while regarding the slide operation reception sections 16 of all of the channel strips 30 as a single slide operation reception section (i.e., slide operation reception section unit 16A) instead of separately detecting a slide operation on the slide operation reception section 16 of each of the channel strips 30. Thus, the user can input a slide operation using the slide operation reception section unit 16A that comprises the slide operation reception sections 16 of all of the channel strips 30.

The slide operation reception section 16 of each of the channel strips 30 may be disposed at such a position as to allow the user to perform a slide operation in the horizontal direction with no difficulty. For example, the slide operation reception section 16 is disposed at a position upward of the fader 33 (near the upper end of the fader 33) on the operation panel surface, in order words, farther from the user, or closer to the upper side of the operation panel, than the fader 33, as shown in FIG. 3. Further, each of the slide operation reception sections 16 may be disposed at such a position as to allow the user to visually check displays on the channel strip display section 34 while performing a slide operation on any of the slide operation reception sections 16 (i.e., slide operation reception section unit 16A). Further, each of the slide operation reception sections 16 may be disposed at such a position as to not prevent the user from viewing the channel strip display sections 34. More specifically, each of the slide operation reception sections 16 may be disposed at such a position as to allow the user to simultaneously view a position of a finger performing a slide operation and the channel strip display sections 34. For example, each of the slide operation reception sections 16 is disposed downward of the channel strip display section 34 (near the lower end of the channel strip display section 34) on the operation panel surface, in other words, closer to the user than the channel strip display section 34.

By performing a slide operation using the slide operation reception section unit 16A, the user can change the respective allocated channels of the channel strips 30 to other channels. Such a change of the allocated channels is effected in such a manner that the entire arrangement of the allocated channels of the channel strips 30 is sequentially (continuously) changed in the same horizontal direction as the operating direction of the slide operation (i.e., along the arranged direction of the channel strips 30). As noted above, a plurality of channels that is an operation target parameter of the slide operation reception sections 16 are managed while kept arranged in the order of consecutive channel numbers, and the arranged order of the allocated channels of the channel strips 30 is fixed in the order of consecutive channel numbers. Thus, a change of the allocated channels is effected in such a manner that the allocated channels of all of the 16 (sixteen) channel strips 30 are collectively shifted (scrolled) in the operating direction without the arranged order of the allocated channels being changed. Namely, the scroll of the allocated channels is performed on all channels that are set as "candidate allocated channels" rather than only on the 16 channels currently allocated to the individual channel strips 30. Namely, as a slide operation is performed using the slide operation reception section unit 16A, for example, in a case where 16 (e.g., first to sixteenth) channels of the first to nth (n is a number of sixteen or more) channels are allocated to the 16 channel strips 30, the n candidate allocated channels are shifted (scrolled) relative to the 16 channel strips 30. Thus, the respective allocated channels of the 16 channel strips 30 are changed to other 16 channels (e.g., second to seventeenth channels, or eleventh to twenty sixth channels). Because the arranged direction of the plurality of channel strips 30 and the operating direction of the slide operation are the same, a slide operation for instructing a change of the allocated channels can be readily performed intuitively in direct association with a changing state of the allocated channels of the channel strips 30.

The following describe processing performed by the CPU 10 in response to a slide operation on any of the slide operation reception sections 16 (i.e., slide operation reception section unit 16A). The slide operation may be performed in any one of several different ways, i.e. as any one of several types of operations, such as a drag operation and a flick-type fashion. Let it be assumed here that a drag operation, one of basic operation fashions, has been performed. The drag operation is an operation in which the user traces (drags) a finger along the slide operation reception sections 16 from a desired start position to a desired end position. In this case, the user moves the finger, touching the contact surface of any one of the slide operation reception sections 16, to the end position while keeping the touch with the contact surface (i.e., without releasing the finger from the contact surface) and then releases the finger from the contact surface at the end position.

Further, the CPU 10 constantly monitors an operating state of the slide operation reception section unit 16A, and once there has been a change in the operating state of the slide operation reception section unit 16A, the CPU 10 detects the change in the operating state. Examples of the change in the operating state of the slide operation reception section unit 16A include changes in presence/absence of a touch, current touched position information, a variation from a last touched position to a current touched position, etc. The touched position information may be any desired position information, such as position information indicative of a channel strip corresponding to the touched position, information indicative of an absolute position, on the slide operation reception section unit 16A, of the touched position, or information indicative of a relative position from a touch start position, or a combination of these information.

Then, the CPU 10 detects operation content of the slide operation reception section unit 16A, corresponding to a detected change in the operating state, as information instructing a change in the value of the operation-target parameter (respective allocated channels of the channel strips 30) of the slide operation reception section unit 16A (i.e., information identifying content of the change). Examples of the detected operation content include a start position, an end position, an operating width from the start position to a current position, operating direction, operating velocity, etc. of the slide operation. Further, the CPU 10 determines whether the slide operation currently received by any of the slide operation reception sections 16 (slide operation reception section unit 16A) is (1) a start operation for starting a new slide operation, (2) a continuation operation for continuing a slide operation or (3) an end operation for terminating or ending a slide operation, but also generates operation information indicative of a characteristic feature of the slide operation.

(1) The start operation is an operation for starting a new slide operation. For example, when a new touch occurs on the slide operation reception section unit 16A from a state where there has been no touch till just before, the CPU 10 can determine that a start operation for starting a new slide operation has been performed. (2) The continuation operation is an operation for continuing a slide operation currently being continuously received. For example, when a finger-touched position has been changed while a touch of the finger on the contact surface of the slide operation reception section unit 16A is continuing, the CPU 10 can determine that a "continuing operation" is being received. (3) The end operation is an operation for ending a slide operation having been continued till just before. For example, when a touch of a finger on the contact surface of the slide operation reception section unit 16A has been discontinued, or when there has been no change in a touched position for more than a predetermined time length, the CPU 10 can determine that reception of a slide operation has been discontinued or completed (i.e., that an end operation has been performed). Then, the CPU 10 performs later-detailed processing, in accordance with an analyzed result of the content of the operation (i.e., content of the operation representing a change in the operating state).

When a new slide operation has been started on the slide operation reception section unit 16A, i.e. when the CPU 10 determines that a start operation has been performed, the CPU 10 retains various operation information about the start operation into the flash memory 11. Here, what are retained into the flash memory 11 as the operation information about the start operation are a start position, operating direction, etc. of the slide operation. Following the start of the slide operation, the CPU 10 checks a continuous touched position variation by the currently-started slide operation (i.e., continuation operation) or an end (end operation) of the slide operation.

Figure 4:
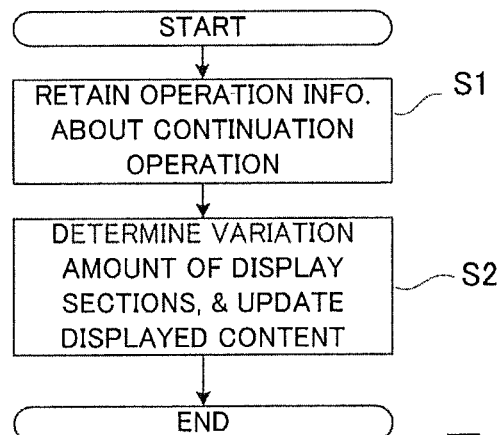
FIG. 4 is a flow chart of a continuation-operation-responsive process performed in response to a user's continuation operation on a slide operation reception section in the embodiment of the controller.

FIG. 4 is a flow chart of a continuation-operation-responsive process performed by the CPU 10 upon determination that there has been performed a continuation operation. First, at step S1, the CPU 10 retains various operation information about the continuation operation into the flash memory 11. The thus-retained various operation information about the continuation operation includes, for example, a current position, operating direction, operating width (i.e., width from a last-detected position or start position of the slide operation to the current position), operating velocity, operating acceleration, etc. of the slide operation. The various operation information about the continuation operation corresponds to an instruction for changing the value of the operation-target parameter given by the continuation operation and continuously received by the slide operation reception section unit 16A.

At next step S2, the CPU 10 determines, on the basis of (or in response to) the operation information retained in the memory 11 at step S1, a variation amount of displayed content on the channel strip display sections 34 of the channel strips 30. More specifically, the CPU 10 determines a varying direction of the displayed content (i.e., a direction in which the displayed content is to be moved) in accordance with the operating direction included in the operation information, and determines a variation amount (i.e., an amount by which the displayed content is to be varied) in accordance with the operating width, operating velocity and operating acceleration included in the operation information. Then, in accordance with the determined variation amount, the CPU 10 updates the displayed content of the channel strip display sections 34 of all of the channel strips 30. Such a variation amount of the displayed content corresponds to a variation (movement) of the value of the operation-target parameter. For example, the variation amount of the displayed content is determined in units smaller than display units of a channel, such as a unit display width of one letter (character) in a letter (character) string that is representative of the channel name of the channel. Then, at step S2, the CPU 10 updates the displayed content in such a manner that the displayed content of the channel strip display sections 34 of the channel strips 30 are shifted, by the determined variation amount, to the channel strip display sections 34 of the channel strips 30 adjoining the above-mentioned channel strip display sections 34 in the operating direction. In this case, what is updated in accordance with the operation information (i.e., variation of the current operation information) retained at step S1 is only the displayed content of the channel strip display sections 34 which is among various information of allocated channels notified on the channel strips 30; namely, the other information than the displayed content, such as sound volume levels indicated by positions of the knobs of the faders 33, is not updated and still retained as before. Further, the displayed content updated in each of the channel strip display sections 34 is information of the newly allocated channel, such as the channel name (displayed on the channel name display portion 34a) and the channel color (displayed on the channel color display portion 34b).

During continuation of the slide operation (i.e., during the continuation operation), the CPU 10 repetitively performs the continuation-operation-responsive process of FIG. 4. Thus, the displayed content of all of the channel strip display sections 34 is together scrolled in substantial real-time response to the currently continuing slide operation. Namely, while an instruction for switching the allocated channels is being continuously received on the slide operation reception section unit 16A, the CPU 10 continuously updates the displayed content on the channel strip display sections 34 (i.e., first information indicated or notified by the first notification section) in response to the instruction being continuously received, but maintains a state existing at the start time point of the slide operation without updating the respective allocated channels of the channel strips 30 and the other information (positions of the faders 33) than the displayed content (i.e., processing behavior as a first update section). Thus, at this stage, the positions of the respective faders 33 of the channel strips 30 are not automatically controlled and hence are not moved. Also, the allocated channels (channel numbers) of the channel strips 30 themselves are not changed at this stage. Namely, a program for execution by the CPU 10 is incorporated such that the CPU 10 functions as the "first update section constructed to, while the slide operation reception section unit 16A is continuously receiving the instruction, not only continuously update the first information, notified by the channel strip display sections 34 (first notification sections), in response to the instruction but also maintain, without updating, second information notified by the knob positions of the faders 33 (second notification sections)".

Figure 5:
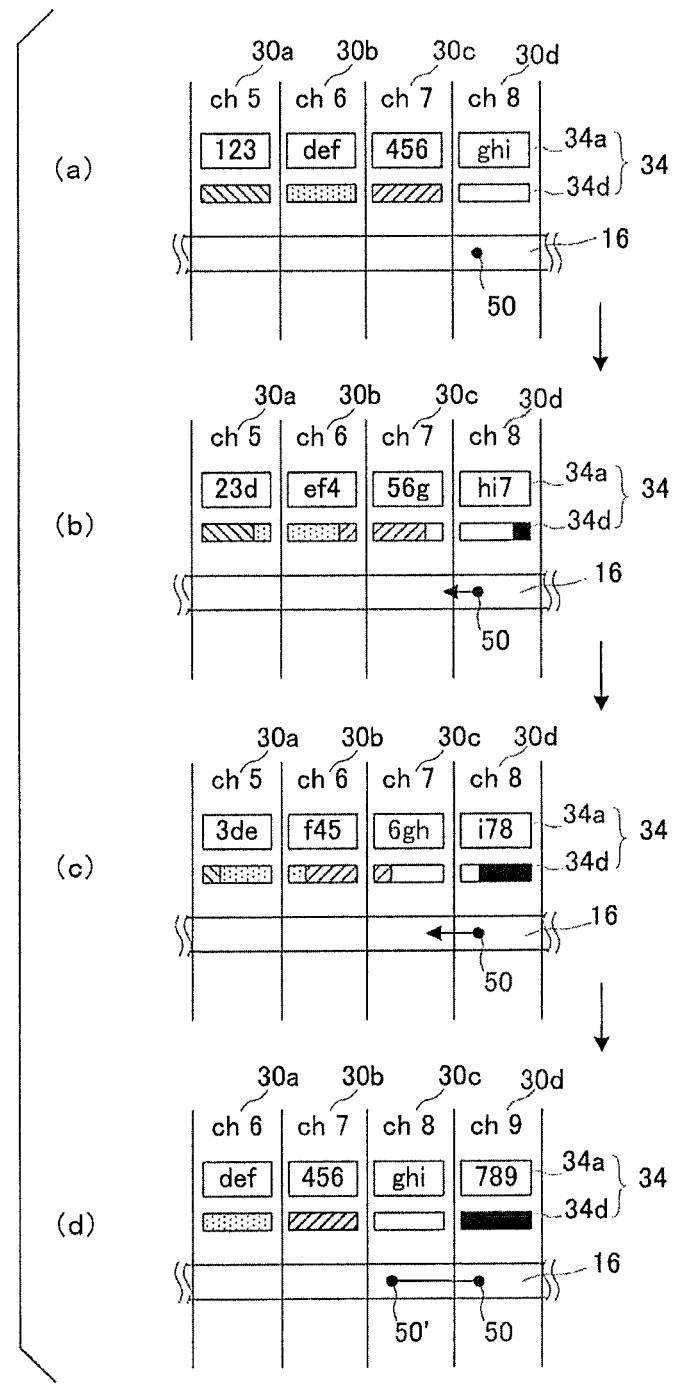
FIG. 5 is a diagram explanatory of how channels allocated to channel strips are scrolled.

The following describe, with reference to (a) to (d) of FIG. 5, a specific example manner in which the displayed content on the channel strip display sections 34 is updated at step S2 above. Let it be assumed here that, as candidate allocated channels to four channel strips 30a, 30b, 30c and 30d, there are six channels of channel Nos. ch 4, ch5, ch6, ch7, ch8 and 9 and channel names "abc", "123", "def", "456", "ghi" and "789". Let it also be assumed here that, at a start time point of a slide operation shown in (a) of FIG. 5, the allocated channels of the channel strips 30a, 30b, 30c and 30d are, from left to right, channel No. ch5, channel No. ch6, channel No. ch7 and channel No. ch8. In this case, channel names "123", "def", "456" and "ghi" corresponding to channel Nos. ch5 to ch8 are displayed on the respective channel name display portions 34a of the channel strips 30a to 30d. Further, different channel colors set for the individual allocated channels (channel Nos. ch5 to ch8) are displayed on the respective channel color display portions 34b of the channel strips 30a to 30d.

As a specific example of a drag operation, assume a case where the user causes a finger to touch a point 50 of the contact surface corresponding to the channel strip 30d as shown in (a) of FIG. 5, then moves the finger leftward on and along the contact surface as shown in (b) and (c), and then releases the finger from the contact surface (i.e., ends the touch) at a point 50' corresponding to the channel strip 30c as shown in (d) of FIG. 5. In this case, in response to the leftward movement (continuous variation) of the touched position, the displayed content on the channel strip display sections 34 gradually shifts from channel names "123", "def", "456" and "ghi" indicative of channel Nos. ch5 to ch8 and channel colors indicative of channel Nos. ch5 to ch8 over to channel names "def", "456", "ghi" and "789" indicative of channel Nos. ch6 to ch9 and channel colors indicative of channel Nos. ch6 to ch9. Such a displayed content shift is associated with a shift of the value of the operation-target parameter of the slide operation reception section unit 16A and visually indicates that the value of the parameter is shifting.

For example, the displayed content on the channel name display section 35a of the second channel strip 30c from the right, which was "456" at the start time point in (a) of FIG. 5, gradually changes to "56g", "6gh" and "ghi", as shown in (b), (c) and (d) of FIG. 5, in response to the leftward slide operation. Namely, channel name "ghi" of channel No. ch8 greater in channel No. than channel No. ch7 and adjoining channel No. ch7 from backward (rightward) in the operating direction (i.e., located to the right of channel No. ch7 (channel strip 30c) or immediately following channel No. ch7 in the sliding direction) gradually appears from the right end of the channel name display portion 34a of the channel strip 30c, while channel name "456" of channel No. ch7 gradually shifts, starting with the letter located forwardmost (leftmost) in the operating direction, out of the display portion 34a of channel No. ch7 (channel strip 30c) to channel No. ch6 (channel strip 30b) adjoining channel No. ch7 from forward (leftward) in the operating direction (located to the left of channel No. ch7 or immediately preceding channel No. ch7 in the operating direction). Similarly to the channel number, the channel color of channel No. ch7 displayed on the channel color portion 34b of No. ch7 (channel strip 30c) gradually changes to the channel color of channel No. ch8 (channel strip 30d) following channel No. ch7 in the operating direction, while the channel color indicative of channel No. ch7 gradually shifts to the channel strip 30b located to the left of the channel strip 30c (immediately preceding the channel strip 30c). Namely, during the continuation operation, the CPU 10 gradually shifts the displayed content of each allocated channel (e.g., channel name "456") to the channel strip display section 34 of the channel strip 30 adjoining that channel in the sliding operating direction while displaying the displayed content (channel name "456") across the two adjoining channel strips 30.

Further, the displayed content of the channel name display section 34 of the rightmost channel strip 30d in FIG. 5 gradually changes, in response to the leftward slide operation, to channel name "789" and channel color of channel No. ch9 adjoining channel No. ch8 from backward (rightward) (located to the right of or immediately following channel No. ch8) in the operating direction (i.e., greater in channel number than channel No. ch8). Namely, on the strip display section 34 of the channel strip located at the backwardmost, in the operating direction, of the four channel strips, there newly gradually appears information about channel No. ch9 immediately following channel No. ch8, in response to the slide operation. The channel newly gradually appearing here is a channel that has not been set as an allocated channel to any one of the channel strips at the start time point of the slide operation. On the other hand, the displayed content on the strip display section 34 of the channel strip located at the forwardmost in the operating direction (leftmost channel strip 30a in the illustrated example of FIG. 5) gradually shifts forward in the operating direction out of the channel strip 30a, in response to the slide operation.

Figure 6:
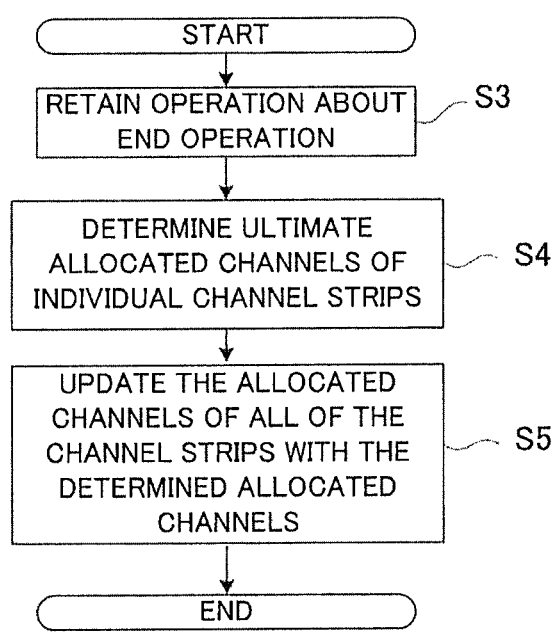
FIG. 6 is a flow chart of an end-operation-responsive process performed in response to a user's end operation on the slide operation reception section in the embodiment of the controller.

FIG. 6 is a flow chart of an end-operation-responsive process performed by the CPU 10 upon determination that there has been performed an end operation. First, at step S3, the CPU 10 retains various operation information about the end operation into the flash memory 11. The various operation information about the end operation is operation information pertaining to a continuous slide operation (i.e. a single operation continuing from a time point at which a finger has touched the contact surface of the reception section unit 16A to a time point at which the finger has been released from the contact surface of the reception section unit 16A) having been ended by the current end portion. More specifically, the various operation information about the end operation includes, for example, an end position, operating direction, operating width (distance) from a start position to an end position, operating velocity, operating acceleration at the end point, etc. of the slide operation.

At next step S4, the CPU 10 determines channels to be newly allocated to the individual channel strips 30 on the basis of the operation information retained at step S3 above. The value of the operation-target parameter (allocated channels to the channel strips 30) itself gradually shifts in response to the instruction for changing the value of the operation-target parameter as given as the slide operation (continuation operation) and continuously received till the time point of the current end operation. In accordance with the progress of the shift of the value of the operation-target parameter, the CPU 10 ultimately determines the channel allocation to the individual channel strips 30. For example, the CPU 10 determines a shift amount of the allocated channels on the basis of the operating width from the start position to the end position and operating direction of the current slide operation. Then, in accordance with the shift amount determined as above, the CPU 10 shifts (scrolls) the channels, allocated to the channel strips 30 at the start time point of the slide operation, in the same direction as the operating direction while still keeping the arranged order of channel numbers and thereby determines the shifted-to channels as new allocated channels of the channel strips 30.

At next step S5, the CPU 10 updates the allocated channels of all of the channel strips 30 with the new allocated channels determined at step S4. In the case of a drag operation, the respective allocated channels of all of the channel strips 30 are shifted (changed) by the number of channels corresponding to the operating width, in the operating direction, of the drag operation and in the order of the channel numbers. Namely, the allocated channel to the channel strip 30 corresponding to the start position of the drag operation is shifted to another channel strip 30 corresponding to the end position of the drag operation, and the allocated channel to each of the other channel strips 30 is also shifted by the determined shift amount in the operating direction. In the illustrated example in (a) to (d) of FIG. 5, for example, when a drag operation has been performed by an amount of one channel, the allocated channels of all of the channel strips 30a to 30d are shifted from channel Nos. ch5 to ch8 to channel Nos. ch6 to ch8. Thus, in the case of the drag operation, the user can readily intuitively change the allocated channels of all of the channel strips, without taking much time and labor, with a feeling as if merely shifting the allocated channel of a given channel strip 30 to another channel strip 30.

Then, at step S5, the CPU 10 updates various settings of all of the channel strips 30 in accordance with the newly allocated channels of the channel strips 30. More specifically, the CPU 10 drives, through automatic control, the respective movable faders 33 of the channel strips 30 in accordance with respective parameter values (sound volume level values) of the newly allocated channels, to thereby update positions of the knob portions. More specifically, when the reception, by the slide operation reception section unit 16A, of the instruction for changing the value of the operation-target parameter has been ended without being continued any longer, the CPU 10 updates information notified by the positions of the faders 33 (i.e., second information notified by the second notification section) in response to the instruction (one slide operation) whose reception has been completed (processing as a second update section). Thus, it is possible to prevent the faders 33 from being wastefully moved during the drag operation. Namely, a program for execution by the CPU 10 is incorporated such that the CPU 10 functions as the "second update section constructed to, upon completion of the instruction having been continuously received by the slide operation reception section unit 16A (i.e., continuous instruction), update the second information notified by the knob positions of the faders 33 (second notification sections) in response to the completed instruction".

Also, at step S5, the CPU 10 updates the displayed content on the individual channel strip display sections 34 in accordance with the allocated channels determined at step S4 above. By such updating at step S5, the CPU 10 can ultimately set the displayed content on the individual channel strip display sections 34 at the respective determined allocated channels. Additionally, at step S5, the CPU 10 transmits to the PC 200 data indicative of the new allocated channels determined at step S4 above. The PC 200, having received the data indicative of the new allocated channels, performs processes corresponding to the current allocated channel change, such as one for updating an allocated-channel indicating display on a screen provided by the DAW.

Note that examples of the slide operation include, in addition to the aforementioned drag operation, a flick operation and a bank flick operation. The drag operation is a slide operation in which a user stops or substantially stops moving a touched position at the end of the operation and then releases the finger and in which the finger is not flicked on the contact surface and thus there occurs no or very minute acceleration at the end of the operation. The flick operation is an operation in which a user flicks (slides) a finger on the contact surface at the end of the operation and there occurs an acceleration at the end of the operation. The bank flick operation is a kind of flick operation in which a user flicks a finger more quickly than the ordinary flick operation and thus there occurs a greater acceleration at the end of the operation.

For example, when the CPU 10 has determined that the above-mentioned "end operation" has been performed as an operation effecting a variation in the operating state of the slide operation reception section unit 16A, it can determine, on the basis of acceleration information included in operation information obtained at the end time point of the end operation, which one of a drag operation (with no acceleration), flick operation (with an acceleration smaller than a predetermined value) and bank flick operation (with an acceleration greater than a predetermined value) the currently-received slide operation is.

If the currently-received slide operation has been determined to be a flick operation, the CPU 10 continues the continuation-operation-responsive process of FIG. 4, instead of starting the end-operation-responsive process of FIG. 5, even after the slide operation is ended (i.e., even after a user's finger is released from the contact surface), and thereby continues updating of the value of the operation-target parameter of the slide operation reception section unit 16A and continuous updating (scrolling) of the displayed content on the channel strip display sections 34. The updating after the end of the slide operation may be controlled in such a manner that a scrolling speed (updating speed) of the displayed content gradually gets slower and the scrolling automatically stops within a time period corresponding to an operating velocity of the flick operation. Then, once the scrolling of the displayed content stops, the CPU 10 performs the aforementioned end-operation-responsive process. Then, the CPU 10 changes the respective allocated channels of the channel strips 30 on the basis of results of the updating (i.e., displayed content at the end time point of the scrolling), responsive to the flick operation, of the value of the operation-target parameter of the slide operation reception section unit 16A. Note that the scrolling of the displayed content may be manually stopped by the user re-touching the slide operation reception section unit 16A during the course of the displayed content scrolling.

Further, if the currently-received slide operation has been determined to be a bank flick operation, the CPU 10 updates the displayed content on the channel display sections 34 of all of the channel strips 30 per predetermined block or per predetermined number of channels, such as sixteen channels, but also updates the respective allocated channels of all of the channel strips 30. The process performed in response to the bank flick operation is similar to the aforementioned continuation-operation-responsive process of FIG. 4 and the aforementioned end-operation-responsive process of FIG. 6, except that the updating is performed per predetermined block or per predetermined number of channels.

The flick operation or bank flick operation can change the allocated channels by a single simple operation (i.e., flick operation or bank flick operation) without requiring much time and labor. Particularly, the flick operation or bank flick operation can readily change the allocated channels to a large extent.

In response to each of the flick operation and bank flick operation, the CPU 10 performs, during the "continuation operation", only updating of the displayed content related to information of the allocated channels without performing automatic control of positions of the faders 33. Then, the CPU 10 performs the automatic control for moving the positions of the faders 33 after new allocated channels of the individual channel strips 30 are determined in response to the "end operation". Thus, in the case of the flick operation and bank flick operation too, the user does not have to wastefully move the fader 33 during the slide operation.

The following briefly describe processes performed by the CPU 10 in response to operations of other operators than the slide operation reception section unit 16A. When the knob 31 or 32 or the fader 33 of any one of the channel strips 30 has been operated, the CPU 10 changes a value of a parameter of a channel currently allocated to that channel strip 30 (i.e., current allocated channel of the channel strip 30). Namely, the CPU 10 determines an adjustment amount on the basis of an operating amount, operating direction, etc. of the operated operator and updates, on the basis of the determined adjustment amount, a current value (current data) of a parameter set as an operation target of the operated operator of the channel allocated to the channel strip 30 which the operated operator belongs to. Then, the CPU 10 notifies the PC 200 of a result of the updating so that the result of the updating is reflected in a process of the DAW currently running on the PC 200.

According to the instant embodiment, as set forth above, the user can change, in response to a slide operation on any of the slide operation reception sections 16, i.e. on the slide operation reception section unit 16A, respective allocated channels of the plurality of channel strips 30 to other channels with a feeling as if merely shifting the allocated channel of a given channel strip 30 to another channel strip 30. In this way, the instant embodiment can improve an operability of an operation for changing allocated channels of the plurality of channel strips 30. Because such an operation method for changing the allocated channels in response to a slide operation corresponds directly to an action of changing (shifting) an allocated channel from a given channel strip 30 to another channel strip 30, the change of the allocated channels can be effected by an extremely intuitive operation.

Because the slide operation reception section 16 having an improved operability is disposed within each of the channel strips 30, the instant embodiment allows the user to change the allocated channels of the channel strips 30, without taking much time and labor, using an intuitively-easy-to-perform operation method even during the course of an operation of another operator (e.g., knob 31 or 32 or fader 33) of the channel strip 30.

Further, because the slide operation reception sections 16 corresponding to the channel strips 30 are, as a whole, disposed to extend across two or more channel strips 30 and in such a manner that the arranged direction of the plurality of channel strips 30 corresponds to (agrees with) the operating direction of a slide operation on the slide operation reception section unit 16A, the operation for shifting the allocated channels of the plurality of channel strips 30 can be performed even more intuitively. Further, because the slide operation reception sections 16 are disposed at a position upward of the corresponding faders 33 (in other words, farther from the user, or closer to the upper side of the operation panel than the faders 33), the instant embodiment allows the user to easily perform, in the arranged direction of the plurality of channel strips 30, a slide operation on the slide operation reception section unit 16A when performing a series of operations in which, for example, the slide operation is performed following operations of the faders 33. Further, because the slide operation reception sections 16 are disposed near the corresponding channel strip display sections 34 (immediately below or downward of the channel strip display sections 34 in the illustrated example), the instant embodiment allows the user to change the allocated channels by use of the slide operation reception section unit 16A while visually checking the displayed content without visibility of the channel strip display sections 34 being prevented. As a result, the instant embodiment can achieve a superior operability.

Further, according to the instant embodiment, while an instruction for changing the allocated channels is being continuously received, only the displayed content on the channel strip display sections 34 of the channel strips 30 is updated without the knob positions of the movable faders 33 being updated. Thus, the instant embodiment can not only prevent the movable faders 33 from being unnecessarily fatigued, but also prevent the user from being unnecessarily fatigued due to visual bother. Besides, the user's operation for successively shifting (changing) the allocated channels is not disturbed, and the user can readily check a state of the successive allocated channel change through displays on the channel strip display sections 34.

Furthermore, in the above-described construction where the slide operation reception sections provided for all of the channel strips 30 are regarded as a single slide operation reception section or function as the single slide operation reception section unit 16A, the parameter value of only one or some of the channel strips 30 (e.g., only one channel strip 30) may be adjusted. Alternatively, the parameter value of all of the channel strips 30 may be adjusted with the slide operation reception sections of one or some of the channel strips 30 (e.g., only one channel strip 30) regarded as a single slide operation reception section 16.

Furthermore, the slide operation reception sections 16 may be provided in only some of the channel strips 30 instead of being provided in all of the channel strips 30. In such a case too, the slide operation reception section 16 is provided in each of the some of the channel strips 30, i.e. each of adjoining ones of the some of the channel strips 30, and the slide operation reception sections 16 in the some of the channel strips 30 may be interconnected to function as a single slide operation reception section.

Furthermore, the disposed position of the slide operation reception section 16 in each of the channel strips 30 is not limited to downward of the channel strip display section 34 and may be any other suitable position near the channel strip display section 34, such as upward of the channel strip display section 34. Furthermore, the disposed position of the slide operation reception section 16 in each of the channel strips 30 is not limited to upward of the fader 33 and may be any other suitable position near the fader 33, such as below the fader 33.

Furthermore, the display section (channel strip display section 34) for displaying information about a value of the operation-target parameter (allocated channel) may be provided on the slide operation reception section 16 itself. Namely, the slide operation reception section 16 itself may include LEDs and/or a liquid crystal display.

Note that the slide operation reception section 16 is not limited to a belt shape extending horizontally straight and may be of any other desired shape as long as it can receive a slide operation. For example, the slide operation reception sections 16 provided in all of the channel strips 30 may be disposed to together constitute an arcuate configuration. Alternatively, each of the slide operation reception sections 16 may have an arcuate or rectangular contour.

Further, the slide operation reception section 16 may be constructed in any desired manner as long as it can receive (detect) a slide operation, and a portable general-purpose computer device, such as a tablet terminal, may be used as the slide operation reception section.

In the present invention characterized by notification control, the operation reception section is not limited to the construction of the slide operation reception section described above in relation to the preferred embodiment, and, for example, switching operations using two switches may be employed.

Further, in the present invention, the operation target of the slide operation reception sections 16 may be a value of any other suitable parameter than the allocated channel parameter, such as sound volume balance, pan, designation of a reproduced position of music content or the like. For example, a parameter of a type which is adjusted to a common value to be applied to a plurality of channels is suited as the operation-target parameter of the slide operation reception sections 16.

Furthermore, the construction where the slide operation reception sections 16 are used for channel allocation change control is applicable to a modification where the channel strip 30 (operation section) only for one channel is provided, instead of being limited to the construction where a plurality of the channel strips 30 (operation sections) are provided as in the above-described embodiment. In such a case, the slide operation reception section 16 need not necessarily be provided in the channel strip 30 or channel strip section 35 and may be provided at any other suitable position on the operation panel.

It should also be noted that the present invention may be constructed or implemented as an application program (tablet application) for causing a tablet-type computer device (tablet) as the operation device of the present invention.

Furthermore, the music production system using the controller 100 is not limited to the construction shown in FIG. 1 and may be constructed in any other desired manner as long as it can control the DAW, which is the controlled object, using the controller 100. For example, the controller 100 and the DAW may be constructed physically integrally so that the controller 100 executes the DAW to function as a music production device. Further, in the system construction shown in FIG. 1, the network hub 210 is not necessarily essential and may be dispensed with, in which case the PC 200 executing the DAW, which is the controlled object, and the controller 100 may be interconnected directly as long as the PC 200 and the controller 100 can communicate with each other.

Also note that the basic principles of the present invention are applicable to any other control devices than the above-described controller 100 for the DAW, such as a digital mixing console (digital audio mixer), as long as the control devices include a plurality of operation sections for signal processing channels. For example, a digital mixing console is different from the above-described controller 100 in that it includes, as an electric hardware component, a signal processing section 18 connected to the bus 17 as indicated by broken line in FIG. 2 and audio signal processing, such as mixing processing, is performed within the signal processing section 18. More specifically, by executing various microprograms on the basis of instructions given from the CPU 10, the signal processing section 18 performs various signal processing on audio waveform data input via the communication I/O 12 on the basis of current data stored in the memory 11. The audio waveform data having been processed in this manner are output via the communication I/O 12. Examples of the signal processing on audio waveform data include channel-by-channel sound volume level control of the audio waveform data, channel-by-channel effect impartment to the audio waveform data, and mixing processing of the audio waveform data of a plurality of channels. The digital mixing console can call up some of the plurality of channels, which are to be used in the signal processing by the signal processing section 18, to the channel strips 30 provided in the operation panel (FIG. 3). The other components of the digital mixing console may be constructed in the same manner as the counterparts of the above-described controller 100, so that the same advantageous benefits as the above-described embodiment can be achieved.

This application is based on, and claims priority to, JP PA 2012-246802 filed on 8 Nov. 2012. The disclosure of the priority application, in its entirety, including the drawings, claims, and the specification thereof, are incorporated herein by reference.

What is claimed is:
1. An operation device comprising:
a channel strip to which is allocatable, as a channel allocation, any one of a plurality of signal processing channels, the plurality of signal processing channels including a first channel and a second channel;
a first notification user-interface for the channel strip, the first notification user-interface configured to notify channel indicative information about the signal processing channel allocated to said channel strip;

a second notification user-interface for the channel strip, the second notification user-interface configured to notify parameter value information about the signal processing channel allocated to said channel strip;

a continuous operation user-interface for the channel strip, the continuous operation user-interface configured to detect a continuous operation indicating a user's instruction for switching the channel allocation of said channel strip from the first channel to the second channel;

a processor configured to:

while said continuous operation user-interface is detecting the continuous operation, continuously update the channel indicative information, notified by said first notification user-interface, in response to detection of the continuous operation, such that the first notification user-interface indicates progression of a shifting of the first channel to the second channel, and maintain, without updating, the parameter value information notified by said second notification user-interface, such that the second notification user-interface indicates parameter value information about the first channel during the continuous operation; and upon completion of the continuous operation having been detected by said continuous operation user-interface, update the parameter value information, notified by said second notification user-interface, in response to the completion of the continuous operation, such that the second notification user-interface indicates parameter value information about the second channel after the completion of the continuous operation.

2. The operation device as claimed in claim 1, wherein said continuous operation user-interface is configured to detect a user's slide operation.

3. The operation device as claimed in claim 1, wherein said first notification user-interface includes a display configured to display, as said channel indicative information, information identifying the signal processing channel allocated to said channel strip, and said second notification user-interface configured to visually present, as said parameter value information, information indicative of an operating position of an operator for said channel strip.

4. The operation device as claimed in claim 1, wherein said channel strip includes a fader-type operator, and said second notification user-interface is configured to visually present, as said parameter value information, information indicative of an operating position of an operator for said channel strip via a position of a knob of the fader-type operator.

5. The operation device as claimed in claim 1, wherein a plurality of the channel strips are provided and arranged on an operation panel, the plurality of signal processing channels are allocatable to the plurality of the channel strips in a switchable manner, and the continuous operation to be detected by said continuous operation user-interface is in a form of a user's slide operation, a direction of the slide operation corresponding to an arranged direction of the plurality of the channel strips on the operation panel.

6. An operation device comprising:

a channel strip to which is allocatable, as a channel allocation, any one of a plurality of signal processing channels, the plurality of signal processing channels including a first channel and a second channel;

a channel strip display configured to notify channel indicative information about the signal processing channel allocated to said channel strip;

a fader-type operator configured to notify parameter value information about the signal processing channel allocated to said channel strip;

a contact surface configured to detect a continuous operation indicating a user's instruction for switching the channel allocation of said channel strip from the first channel to the second channel; and a processor configured to:

while said contact surface is detecting the continuous operation, continuously update the first channel indicative information, notified by said channel strip display, in response to detection of the continuous operation, such that the channel strip display indicates progression of a shifting of the first channel to the second channel, and maintain, without updating, the parameter value information notified by said fader-type operator, such that the fader-type operator indicates parameter value information about the first channel during the continuous operation; and upon completion of the continuous operation having been detected by said contact surface, update the parameter value information, notified by said fader-type operator, in response to the completion of the continuous operation, such that the fader-type operator indicates parameter value information about the second channel after the completion of the continuous operation.

7. A non-transitory computer-readable storage medium storing a program executable by a processor for changing channel allocation in an operation device, the operation device comprising: a channel strip to which is allocatable, as a channel allocation, any one of a plurality of signal processing channels, the plurality of signal processing channels including a first channel and a second channel; a first notification user-interface for the channel strip, the first notification user-interface configured to notify channel indicative information about the signal processing channel allocated to said channel strip; a second notification user-interface for the channel strip, the second notification user-interface configured to notify parameter value information about the signal processing channel allocated to said channel strip; a continuous operation user-interface for the channel strip, the continuous operation user-interface configured to detect a continuous operation indicating a user's instruction for switching the channel allocation of said channel strip from the first channel to the second channel, said program, when executed by the processor, causing the processor to perform:

while said continuous operation user-interface is detecting the continuous operation, continuously updating the channel indicative information, notified by said first notification user-interface, in response to detection of the continuous operation, such that the first notification user-interface indicates progression of a shifting of the first channel to the second channel, and maintaining, without updating, the parameter value information notified by said second notification user-interface, such that the second notification user-interface indicates parameter value information about the first channel during the continuous operation; and upon completion of the continuous operation having been detected by said continuous operation user-interface, updating the parameter value information, notified by said second notification user-interface, in response to the completion of the continuous operation, such that the second notification user-interface indicates parameter value information about the second channel after the completion of the continuous operation.

8. A processor-implemented method for changing channel allocation in an operation device, the operation device comprising: a channel strip to which is allocatable, as a channel allocation, any one of a plurality of signal processing channels, the plurality of signal processing channels including a first channel and a second channel; a first notification user-interface for the channel strip, the first notification user-interface configured to notify channel indicative information about the signal processing channel allocated to said channel strip; a second notification user-interface for the channel strip, the second notification user-interface configured to notify parameter value information about the signal processing channel allocated to said channel strip; a continuous operation user-interface for the channel strip, the continuous operation user-interface configured to detect a continuous operation indicating a user's instruction for switching the channel allocation of said channel strip from the first channel to the second channel, said method comprising:

while said continuous operation user-interface is detecting the continuous operation, continuously updating the channel indicative information, notified by said first notification user-interface, in response to detection of the continuous operation, such that the first notification user-interface indicates progression of a shifting of the first channel to the second channel, and maintaining, without updating, the parameter value information notified by said second notification user-interface, such that the second notification user-interface indicates parameter value information about the first channel during the continuous operation; and upon completion of the continuous operation having been detected by said continuous operation user-interface, updating the parameter value information, notified by said second notification user-interface, in response to the completion of the continuous operation, such that the second notification user-interface indicates parameter value information about the second channel after the completion of the continuous operation.

9. The operation device as claimed in claim 1, wherein said first notification user-interface is a channel strip display,
said second notification user-interface is a fader-type operator, and
said continuous operation user-interface is a contact surface.

10. The operation device as claimed in claim 6, wherein said contact surface is configured to detect a user's slide operation.

11. The operation device as claimed in claim 6, wherein said channel strip display includes a display configured to display, as said channel indicative information, information identifying the signal processing channel allocated to said channel strip, and
said fader-type operator is configured to visually present, as said parameter value information, information indicative of an operating position of the fader-type operator via a position of a knob of the fader-type operator.

12. The operation device as claimed in claim 6, wherein a plurality of the channel strips are provided and arranged on an operation panel, the plurality of signal processing channels are allocatable to the plurality of the channel strips in a switchable manner, and
the continuous operation to be detected by said contact surface is in a form of a user's slide operation, a direction of the slide operation corresponding to an arranged direction of the plurality of the channel strips on the operation panel.

13. The non-transitory computer-readable storage medium as claimed in claim 7, wherein said continuous operation user-interface is configured to detect a user's slide operation.

14. The non-transitory computer-readable storage medium as claimed in claim 7, wherein said first notification user-interface includes a display configured to display, as said channel indicative information, information identifying the signal processing channel allocated to said channel strip,
said channel strip includes a fader-type operator, and
said second notification user-interface is configured to visually present, as said parameter value information, information indicative of an operating position of an operator for said channel strip via a position of a knob of the fader-type operator.

15. The non-transitory computer-readable storage medium as claimed in claim 7, wherein a plurality of the channel strips are provided and arranged on an operation panel, the plurality of signal processing channels are allocatable to the plurality of the channel strips in a switchable manner, and
the continuous operation to be detected by said continuous operation user-interface is in a form of a user's slide operation, a direction of the slide operation corresponding to an arranged direction of the plurality of the channel strips on the operation panel.

16. The non-transitory computer-readable storage medium as claimed in claim 7, wherein
said first notification user-interface is a channel strip display,
said second notification user-interface is a fader-type operator, and
said continuous operation user-interface is a contact surface.

17. The processor-implemented method as claimed in claim 8, wherein said continuous operation user-interface is configured to detect a user's slide operation.

18. The processor-implemented method as claimed in claim 8, wherein said first notification user-interface includes a display configured to display, as said channel indicative information, information identifying the signal processing channel allocated to said channel strip,
said channel strip includes a fader-type operator, and
said second notification user-interface is configured to visually present, as said parameter value information, information indicative of an operating position of an operator for said channel strip via a position of a knob of the fader-type operator.

19. The processor-implemented method as claimed in claim 8, wherein a plurality of the channel strips are provided and arranged on an operation panel, the plurality of signal processing channels are allocatable to the plurality of the channel strips in a switchable manner, and
the continuous operation to be detected by said continuous operation user-interface is in a form of a user's slide operation, a direction of the slide operation corresponding to an arranged direction of the plurality of the channel strips on the operation panel.

20. The processor-implemented method as claimed in claim 8, wherein
said first notification user-interface is a channel strip display,
said second notification user-interface is a fader-type operator, and
said continuous operation user-interface is a contact surface.

* * * * *